CLEMENTS & NEALEY.
Cultivator.
No. 102,223. Patented April 26, 1870.
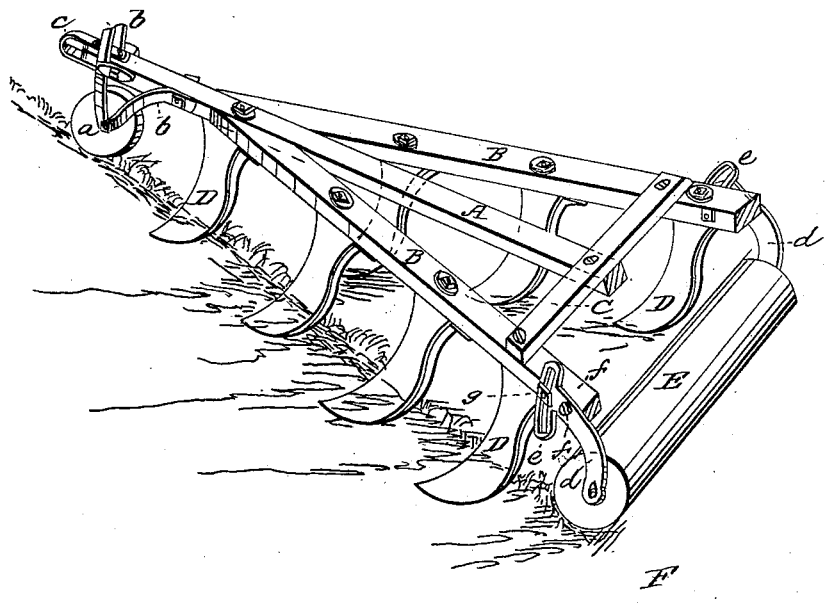
Witnesses:
H. K. Porter
Eugene F. O'Neil
Inventors:
Albion P. Clements
John C. Nealey
By T. W. Porter
attorney.

UNITED STATES PATENT OFFICE.

ALBION P. CLEMENTS AND JOHN C. NEALEY, OF MONROE, MAINE.

IMPROVEMENT IN CULTIVATORS.

Specification forming part of Letters Patent No. 102,223, dated April 26, 1870.

*To all whom it may concern:*

Be it known that we, ALBION P. CLEMENTS and JOHN C. NEALEY, of Monroe, in the county of Waldo and State of Maine, have invented a new and useful Improvement in Cultivators; and we do hereby declare that the following, taken in connection with the drawing which accompanies and forms part of this specification, is a description of our invention sufficient to enable those skilled in the art to which it appertains to practice it.

This invention relates to a new and useful improvement in cultivators which are used to pulverize and loosen the ground after it is plowed; and it consists in combining with the cultivator as usually constructed—with the forward adjusting roller or wheel—an adjustable roller attached to the rear end of the cultivator, of a length equal to the width of the latter, so constructed and arranged that it shall, in conjunction with the forward roller, serve to gage the depth of work performed, and in addition thereto smooth, roll, and pulverize the surface of the ground.

The drawing represents our invention in perspective.

A represents the center bar of the frame. B B are the side bars, and C the transverse bar, all being united together in the usual manner. D D are the teeth. $a$ is the forward roller, which revolves upon a pivot or bolt secured in the brackets $b\ b$. These brackets are pivoted at their rear ends upon a bolt, as shown, while the forward ends have a rising and falling motion, and are secured in position by a bolt and buttons in the usual manner. $c$ is the draft-clevis. E is the after roller, which revolves freely upon pivots in the ends of stays $d\ d$. These stays are pivoted upon pivots $f$. At the front ends these stays terminate each in a transverse loop, $e$, through which are inserted, into bars B B, the screw-bolts $g$.

For the purpose of adjusting the roller E, the bolts $g$ are slackened, when the roller is raised or lowered to the desired position, when by tightening bolts $g$ they press the loops $e$ firmly against bars B B, thereby holding the roller in place.

The roller E may be constructed of wood and covered with thin metal or in any manner to insure lightness, as its office is to guide the depth of the rear end of the cultivator and smoothly roll the soil as the cultivator leaves it.

F represents the surface of the soil when the cultivator is being used.

What we claim as new, and desire to secure by Letters Patent, is—

The combination of the cultivator proper, the front adjusting-wheel, $a$, and the adjustable guiding and smoothing roller E, all constructed and arranged to operate substantially as described and shown.

ALBION P. CLEMENTS.
JOHN C. NEALEY.

Witnesses:
FRED. W. RITCHIE,
WM. W. RITCHIE.